United States Patent
Beun

(10) Patent No.: US 11,804,907 B2
(45) Date of Patent: Oct. 31, 2023

(54) ULTRA HIGH SPEED COMMUNICATIONS SYSTEM WITH FINITE RATE OF INNOVATION

(71) Applicant: The Government of the United States of America, as represented by the Secretary of the Navy, Arlington, VA (US)

(72) Inventor: Joshua Beun, Alexandria, VA (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 0 days.

(21) Appl. No.: 17/376,083

(22) Filed: Jul. 14, 2021

(65) Prior Publication Data

US 2022/0021464 A1    Jan. 20, 2022

Related U.S. Application Data

(60) Provisional application No. 63/051,428, filed on Jul. 14, 2020.

(51) Int. Cl.
| | |
|---|---|
| *H04B 10/60* | (2013.01) |
| *H04B 10/50* | (2013.01) |
| *G06F 7/548* | (2006.01) |
| *H04L 5/00* | (2006.01) |

(52) U.S. Cl.
CPC ........... *H04B 10/60* (2013.01); *G06F 7/548* (2013.01); *H04B 10/50* (2013.01); *H04L 5/0048* (2013.01)

(58) Field of Classification Search
None
See application file for complete search history.

(56) References Cited

U.S. PATENT DOCUMENTS

2017/0180168 A1*  6/2017  Terry ................... H04L 69/22

OTHER PUBLICATIONS

Beun, "Ultra High Speed Communications System with Finite Rate of Innovation", Advanced Systems Technology Branch Space Systems Development Division, Naval Research Laboratory, NRL/MR/8125-20-10,107, Jul. 9, 2020. (Year: 2020).*

Vetterli, "Sampling signals with finite rate of innovation", IEEE Transactions on Signal Processing (vol. 50, Issue: 6, Jun. 2002), 10.1109/TSP.2002.1003065 (Year: 2002).*

Mulleti, "Paley-Wiener Characterization of Kernels for Finite-Rate-of-Innovation Sampling", IEEE Transactions on Signal Processing, vol. 65, No. 22, Nov. 15, 2017 (Year: 2017).*

(Continued)

*Primary Examiner* — Darren E Wolf
(74) *Attorney, Agent, or Firm* — US Naval Research Laboratory

(57) ABSTRACT

A finite rate of innovation (FRI) communications system includes a reference signal generator, an FRI modulator configured to apply an FRI kernel and encode information onto the reference signal, and a transmitter configured to transmit the encoded signal. The FRI kernel is one of a sinc function kernel or a Gaussian kernel. A receiver unit is configured to receive an encoded signal, convert the encoded signal into a digital signal, and demodulate and recover information from finite rate of innovation parameters in the digital signal.

4 Claims, 2 Drawing Sheets

(56) References Cited

OTHER PUBLICATIONS

Wilson "Pulse time modulation techniques for optical communications: a review", IEE Proceedings J- Optoelectronics, vol. 140, No. 6, 1993.

Whittaker "On the Functions which are represented by the Expansions of the Interpolation Theory" Proc. Roy. Soc., vol. 35, pp. 181-194, 1915.

* cited by examiner

ULTRA HIGH SPEED COMMUNICATIONS SYSTEM WITH FINITE RATE OF INNOVATION

RELATED APPLICATIONS

This application claims the benefit of U.S. Provisional Application No. 63/051,428 filed Jul. 14, 2020, which is hereby incorporated herein by reference.

FEDERALLY-SPONSORED RESEARCH AND DEVELOPMENT

The United States Government has ownership rights in this invention. Licensing inquiries may be directed to Office of Technology Transfer, U.S. Naval Research Laboratory, Code 1004, Washington, D.C. 20375, USA; +1.202.767.7230; techtran@nrl.navy.mil, referencing NC 113401.

FIELD OF INVENTION

The present invention relates generally to communication systems, and more particularly to a communication system utilizing finite rate of innovation parameters.

BACKGROUND

The modern world possesses a nearly insatiable thirst for data. Many user applications across defense, consumer, commercial, government, and academic sectors have demanding requirements for high data throughput and low latency. The burden of data transport falls on communications systems which in turn are constrained by regulation (spectrum management and human safety), engineering (size, weight, power and cost) and by physical realities (e.g. the finite speed of light). Conventionally, increasing the data throughput of a communications system involves increasing the bandwidth (number of degrees of freedom per unit time) of the information encoded onto the signal which has several consequences: higher performance transmitter modulators, wider bandwidth receiver components, faster digital to analog converters and reduced sensitivity, to name a few. Objectively speaking, an ideal solution for meeting high data rate requirements is to increase the information content of a signal without increasing its bandwidth, a seemingly quixotic endeavor.

Conventional communications signals are, therefore, bandlimited, that is to say the baseband representation of a signal x(t) with Fourier transform X(ω) obeys the following $$X(\omega)=0, |\omega|>\omega_m \qquad (1)$$

The number of degrees of freedom per unit time of a bandlimited signal is equivalent to the bandwidth B $$B = \frac{\omega_m}{\pi} \qquad (2)$$

In practice, communications systems obtain a discrete set of samples of a signal with an objective of minimizing the number of samples necessary to represent a signal. It is readily apparent that the high bandwidth signals required by ultra-high speed communications require a greater number of samples than their lower speed counterparts as they contain more degrees of freedom per unit time.

Another impact of high bandwidths is on the receiver subsystem. High bandwidths reduce the sensitivity of receivers, hence requiring greater link margin. For illustration, equation (3) below describes the sensitivity of a room temperature RF system as a function of bandwidth, BW, and noise figure, NF.

$$S_{RF}=-174+10 \log_{10} BW+NF \qquad (3)$$

Above, $S_{RF}$ is in dBm with lower values representing better sensitivity.

SUMMARY OF INVENTION

Finite rate innovation (FRI) signals differ from conventional communications systems as they are not bandlimited. Instead they possess a quality known as innovations; it is this quality that is finite per unit time. This disclosure now presents a novel method for implementing FRI signals in a real-world communications system. Included are methods for both RF and Optical communications systems. Embodiments of the present invention may include a novel process to realize an ultra-high speed communications system. Exemplary systems provide greater data throughput using lower bandwidth signals than existing communication systems. The invention also has additional applications to time transfer applications.

According to one aspect of the invention, a finite rate of innovation (FRI) communications system includes a reference signal generator, an FRI modulator configured to apply an FRI kernel and encode information onto the reference signal, and a transmitter configured to transmit the encoded signal. The FRI kernel is one of a sinc function kernel or a Gaussian kernel.

Optionally, the reference signal generator generates a radio frequency signal.

Optionally, the reference signal generator generates an optical signal and the FRI kernel is a Gaussian kernel.

Optionally, the communications system includes a receiver configured to receive an encoded signal; an analogue-to-digital converter configured to convert the encoded signal into a digital signal; and a demodulator configured to recover information from finite rate of innovation parameters in the digital signal.

According to another aspect of the invention, a finite rate of innovation (FRI) communications system includes a receiver configured to receive an encoded signal; an analogue-to-digital converter configured to convert the encoded signal into a digital signal; and a demodulator configured to recover information from finite rate of innovation parameters in the digital signal.

Optionally, the FRI communications system includes a bandpass filter configured to bandwidth limit and anti-alias the encoded signal.

Optionally, the FRI communications system includes an optical filter configured to spectral limit the encoded signal.

The foregoing and other features of the invention are hereinafter described in greater detail with reference to the accompanying drawings.

DETAILED DESCRIPTION

FRI signals differ from conventional communications systems as they are not bandlimited. Instead they possess a quality known as innovations; it is this quality that is finite per unit time. The equation below shows an illustrative form of FRI signals $$x(t) = \sum_{n \in Z} \sum_{r=0}^{R} c_{nr} \delta\left(\frac{t - t_n}{T}\right) \quad (4)$$

Above $C_{nr}$ are scalar coefficients, $\delta(t)$ is the dirac delta function and $t_n$ are time instants. The degrees of freedom present in the signal are $C_{nr}$ and $t_n$: i.e., this is where the information is encoded or "stored" in the signal. Note that while $\delta(t)$ is highly localized in time, it is not band limited. Define a function $C_x(\tau_a, \tau_b)$ which counts the degrees of freedom on an interval from $\tau_a$ to $\tau_b$. The rate of innovation of a signal is defined as $$\rho = \lim_{\tau \to \infty} \frac{1}{\tau} C_x\left(-\frac{\tau}{2}, \frac{\tau}{2}\right) \quad (5)$$

Only ρ measurements per unit time are necessary to fully represent a signal with a finite rate of innovation. The implications of this statement are that relative to bandlimited signals, FRI signals contain more information per measurement. The challenge behind measuring FRI signals is that they require non-bandlimited sampling kernels; non-bandlimited sampling kernels are not practical to implement in real-world digital receivers.

An exemplary embodiment realizes a real-world RF FRI communications system by modulation of the RF signal with either a sinc function kernel or a Gaussian kernel. The equations below show archetypes for the sinc kernel and the Gaussian kernel respectively.

$$\phi(t) = \text{sinc}\left(\frac{t}{T}\right) \quad (6)$$

$$\phi(t) = \exp\left(\frac{-t^2}{2\sigma^2}\right) \quad (7)$$

The FRI modulator realizes the sinc kernel through amplitude and phase modulation. The FRI modulator realizes the Gaussian kernel through amplitude modulation.

The remainder of the RF FRI system utilizes standard RF components. Recovery of the information is performed through standard methods, for example the annihilator method or noisy spectral estimation techniques.

Figure 1:
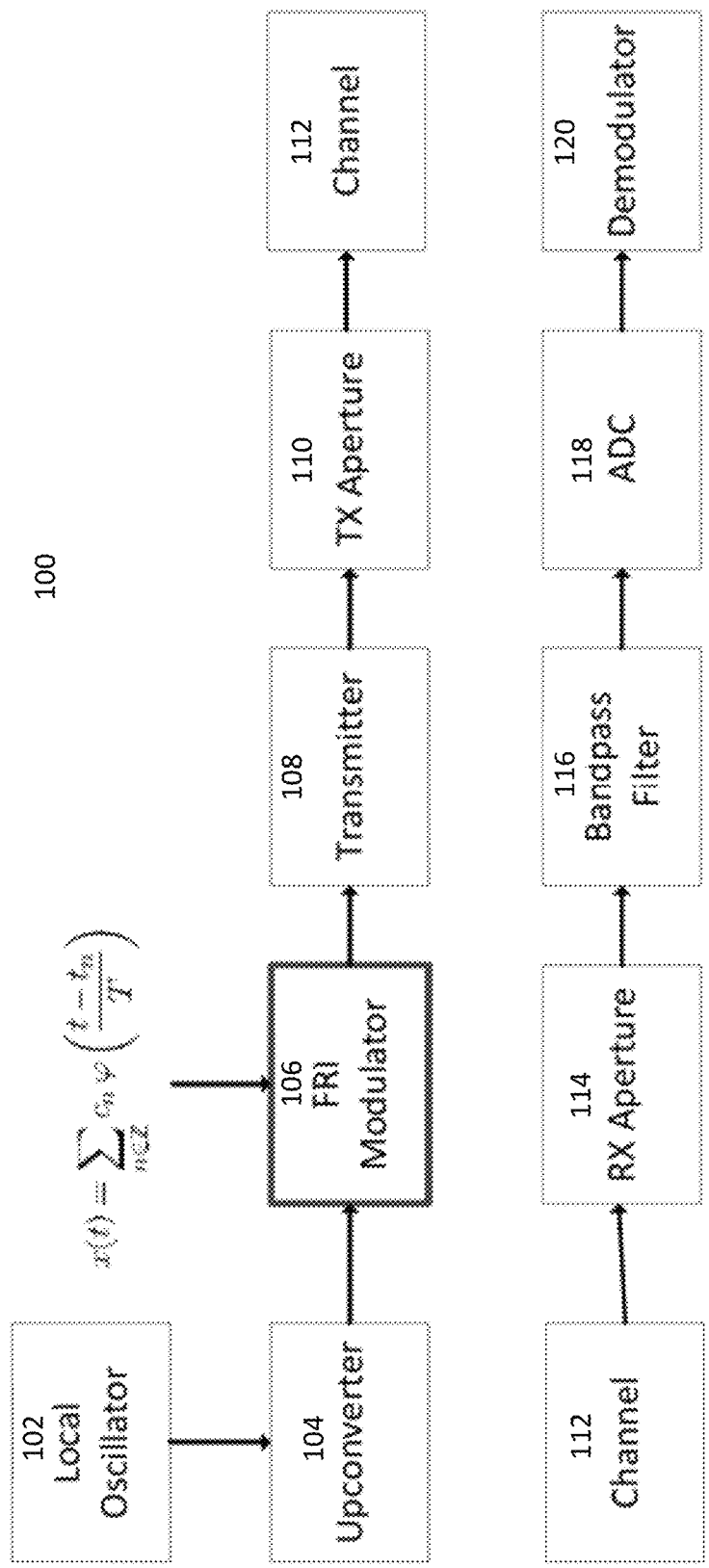
FIG. 1 shows a block diagram of an exemplary radio-frequency FRI communication system.

FIG. 1 shows a block diagram of an exemplary RF FRI communications system 100. At block 102, a local oscillator generates a reference clock source. At block 104, an upconverter provides RF reference derived from the clock source. At block 106, the FRI modulator applies an FRI kernel to pulse-position modulation (PPM) and encodes information onto the RF signal. A TX aperture 110 couples transmitter 108 to channel (antenna for OTA applications) 112. A media is used as a channel 112 between TX and RX subsystems (atmosphere for OTA applications). An RX aperture 114 couples the channel 112 to the receiver (antenna for OTA applications). A bandpass filter 116 is used for bandwidth limiting and anti-aliasing. An analog-to-digital converter (ADC) 118 converts the received analog signal into a digital signal. A demodulator 120 recovers information from the digital signal.

Another exemplary embodiment includes a real-world Optical RFI communications system using spatial modulation of the Optical signal by slewing the positioning optics, such as with a fast steering mirror (FSM), of the transmitter. As the gain of an optical beam is Gaussian spatially, the consequence of slewing the FSM is imposing a Gaussian kernel onto the time domain at the receiver.

The remainder of the Optical RFI system may utilize standard optical components. Recovery of the information is performed through standard methods, for example the annihilator method or noisy spectral estimation techniques.

Figure 2:
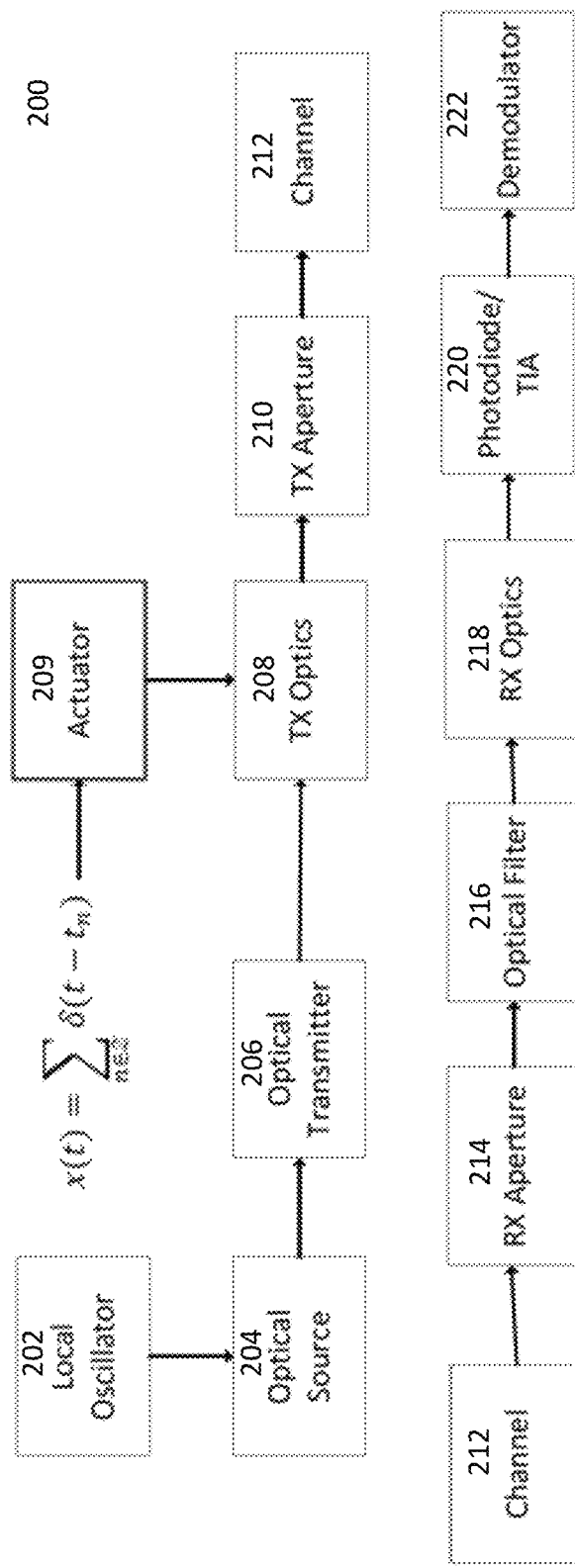
FIG. 2 shows a block diagram of an exemplary optical communication system.

FIG. 2 shows a block diagram of an Optical RFI communications system 200. At block 202, a local oscillator generates a reference clock source. At block 204, an optical source generates CW tone at optical wavelength from a clock source. An optical transmitter 206 (e.g., an Erbium-doped fiber amplifier (EDFA) may be used) amplifies the optical source 204. TX optics 208 (e.g., an FSM) steer the optical beam. The optics 208 may be actuated by actuator 209, configured to actuate the optics according to the Gaussian kernel discussed above. At block 210, TX aperture (lenses for OTA applications) couples transmitter modules to channel 212. At block 212, a media is used as a channel between TX and RX subsystems (atmosphere for OTA applications). At block 214, an RX aperture couples the channel to the receiver (lenses for OTA applications). At block 216, an optical filter is used for spectral limiting. At block 218, RX optics steers the optical beam (e.g., an FSM). At block 220, a photodiode/transimpedance amplifier (TIA) develops a digital signal from the optical signal (e.g., an avalanche photodiode (APD) and TIA). At block 222, a demodulator recovers information from the digital signal.

Exemplary systems provide greater data throughput using lower bandwidth signals than existing communication systems. Exemplary systems are the first practical high-speed communications systems implementing a FRI process. Further, exemplary systems could also provide ultra-high quality time transfer between devices.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A finite rate of innovation (FRI) communications system comprising:
a reference signal generator;
an FRI modulator configured to apply an FRI kernel and encode information onto the reference signal; and a transmitter configured to transmit the encoded signal,
wherein the FRI kernel is one of a sinc function kernel or a Gaussian kernel.

2. The FRI communications system of claim 1, wherein the reference signal generator generates a radio frequency signal.

3. The FRI communications system of claim 1, wherein the reference signal generator generates an optical signal and the FRI kernel is a Gaussian kernel.

4. The FRI communications system of claim 1, further comprising:
- a receiver configured to receive an encoded signal;
- an analogue-to-digital converter configured to convert the encoded signal into a digital signal; and
- a demodulator configured to recover information from finite rate of innovation parameters in the digital signal.

* * * * *